United States Patent [19]

Stojanovski

[11] Patent Number: 4,525,110
[45] Date of Patent: Jun. 25, 1985

[54] INDEXABLE BALL NOSE END MILL

[76] Inventor: Stojan Stojanovski, 1950 Birchwood, Troy, Mich. 48084

[21] Appl. No.: 495,643

[22] Filed: May 18, 1983

[51] Int. Cl.³ .............................. B23C 5/02; B23C 5/20
[52] U.S. Cl. ........................................ 407/40; 407/42; 407/48; 407/54; 407/62; 407/103; 407/113
[58] Field of Search .............. 407/41, 40, 49, 69, 407/48, 53, 103, 67, 61, 62, 64, 65, 50, 36, 113, 34, 35, 43, 46, 47, 70, 54, 107, 108; 408/713, 197, 238, 239, 240

[56] References Cited

U.S. PATENT DOCUMENTS

| | | | |
|---|---|---|---|
| 3,036,363 | 5/1962 | Novkov | 407/40 |
| 3,149,400 | 9/1964 | Breuning | 407/111 |
| 3,380,137 | 4/1968 | MacPetrie et al. | 407/113 |
| 3,629,919 | 12/1971 | Trevarrow | 407/103 |
| 4,087,194 | 5/1978 | Takacs et al. | 408/713 |
| 4,315,706 | 2/1982 | Erkfritz | 407/113 |

FOREIGN PATENT DOCUMENTS 2653302 10/1978 Fed. Rep. of Germany ........ 407/40
2082102  3/1982 United Kingdom ................. 407/36

*Primary Examiner*—Leonidas Vlachos
*Assistant Examiner*—Jerry Kearns
*Attorney, Agent, or Firm*—Charles W. Chandler

[57] ABSTRACT

An indexable ball nose end mill is disclosed comprising an elongated tool holder having an insert clamped on one end. The insert is indexable such that when one cutting edge has become dull, the insert can be reversed end-for-end to use the cutting edge along the opposite side. The insert is clamped in its position between one end of the holder body and a cap having three protuberances. Two of the protuberances are received in a pair of generally frusto-conical recesses in the insert, and the third is received in a third opening in the body. A threaded fastener connects the cap to the body to clamp the insert in its cutting position. In another embodiment of the invention, two indexable inserts are mounted on the holder body.

8 Claims, 6 Drawing Figures

4,525,110

1

INDEXABLE BALL NOSE END MILL

BACKGROUND OF THE INVENTION

This invention is related to indexable ball nose end mills, and more particularly to means for clamping a cutting insert in a holder in which a pair of protuberances carried on a cap are received in a pair of recesses in the insert and a third protuberance is received in a recess in the holder body for precisely locating the insert in its cutting position.

Indexable ball nose end mills conventionally are clamped on the end of a tool holder by a fastener received through an opening through the insert. The problem is that the insert does not maintain its cutting tolerances after it has been reversed end-for-end to employ the opposite cutting edge.

SUMMARY OF THE INVENTION

The broad purpose of the present invention is to provide an improved ball nose end mill in which the cutting insert has a pair of recesses engaged by the clamping cap for locating the insert in either of two cutting positions. In one form of the invention, the holder body supports one insert. The body has a keyway, one end of which is disposed adjacent the insert. A recess in the body adjacent the opposite end of the keyway is disposed in a common plane with respect to the two recesses in the insert. A cap is mounted on the insert and the body, and a threaded fastener connects the cap to the body. As the fastener is connected to the body, three protuberances on the cap engage corresponding recesses in both the insert and the body to precisely locate the insert in a clamped cutting position.

The insert can be indexed by merely loosening the cap so the protuberances in the cap clear the recesses, and reversing the insert end-for-end so that its recesses are received with the protuberances in the cap, but in a reversed position.

In another embodiment of the invention, a pair of inserts are mounted on opposite sides of the holder nose, each insert having a pair of recesses. The cap has a corresponding pair of protuberances received in the recesses of both inserts, and a fifth protuberance is received in a recess in the body to precisely cam the inserts toward a their respective cutting positions as the cap is tightened onto the body.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
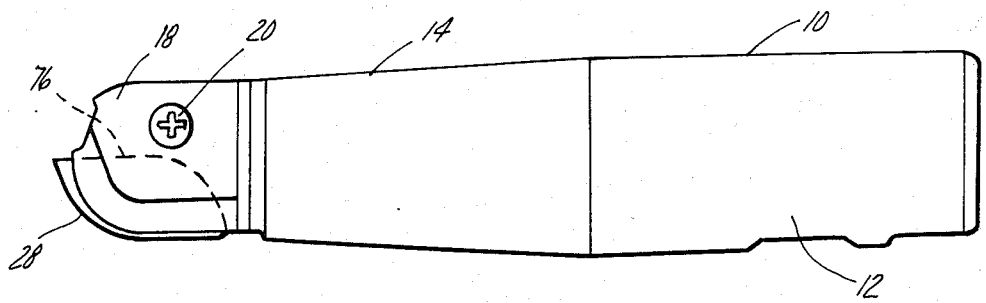
FIG. 1 is a longitudinal view of a ball nose end mill illustrating the preferred embodiment of the invention.
Figure 2:
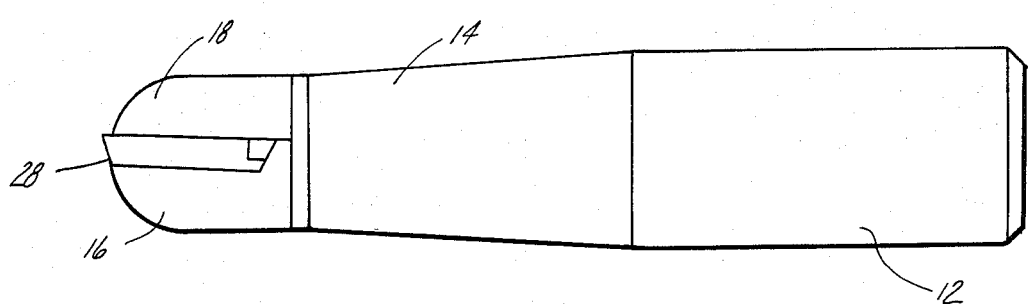
FIG. 2 is a view illustrating the tool of FIG. 1 rotated 90°.
Figure 3:
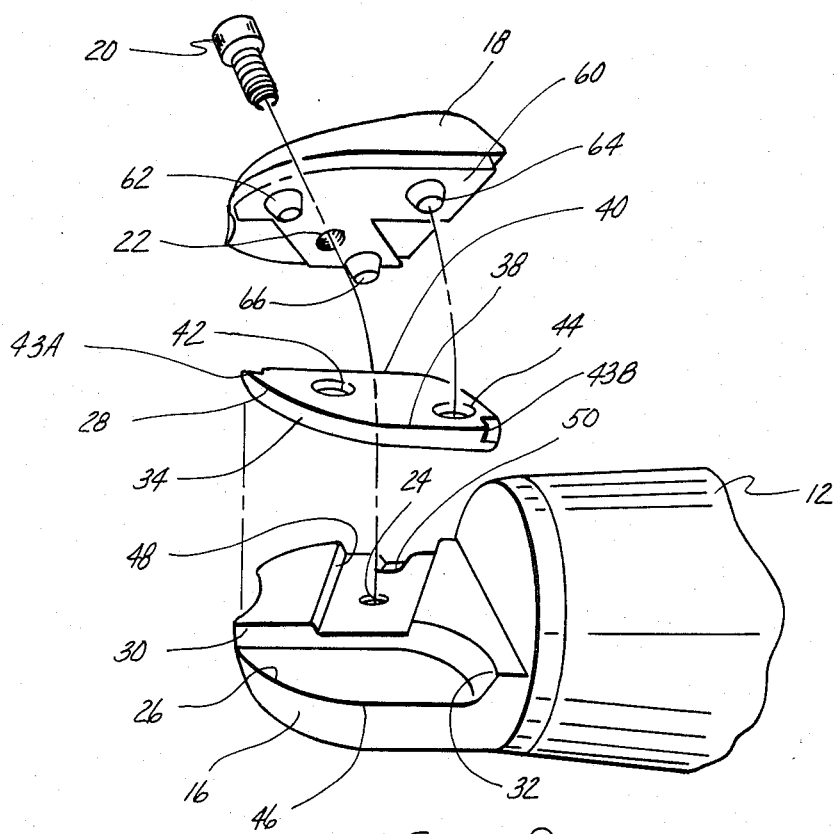
FIG. 3 is an exploded view of the tool of FIG. 1.

Referring to the drawings, FIGS. 1–3 illustrate a ball nose end mill 10 having an elongated metal body 12. The mid-section of the body is tapered at 14. The end of the end mill has a generally ball-shaped configuration.

Cap 18 is connected to the body by threaded fastener 20 which passes through opening 22 in the cap. The end of fastener 20 is received in tapped opening 24 in the body.

The body has a pocket 26 with a planer base for receiving insert 28 in cutting position, illustrated in FIGS. 1 and 2. The body has a somewhat linear wall 30 bounding one side of pocket 26 and which terminates in a rounded wall 32. The height of walls 30 and 32 accommodates the thickness of insert 28.

The insert has a somewhat symmetrical configuration, one end being similar to the opposite end. The insert includes a pair of sides 34 and 36 joined together at opposite ends of the insert. Upper edge 38 of the insert, as viewed in FIG. 3, defines one cutting edge, while the opposite upper edge 40 defines a second cutting edge.

The upper flat surface of the insert is wider than the base of the insert, and has a pair of recesses 42 and 44. Each recess has a generally curved side wall and a flat bottom. The outer edge of the base of the insert generally corresponds to edge 46 of the body when the insert is in its cutting position. The top surface of the insert containing recesses 42 and 44 is slightly wider than the base so that the cutting edge extends beyond both the base and the cap, as illustrated in FIGS. 1 and 2. The ends of the insert are relieved at 43A and 43B so that the tool can be used in a plunge cut into a workpiece (not shown).

The body has keyway 48, one end of which terminates in wall 30. The bottom surface of keyway 48 is generally disposed in a plane common to the top surface of the insert when it is disposed on its cutting position. The body has a half recess 50, similar to the recesses in the insert, at the opposite end of the keyway. Recess 50 also has curved side walls and a flat bottom.

The cap has a generally flat surface 60 facing the insert. The cap has three protuberances 62, 64 and 66 receivable respectively into recesses 42 and 44 in the insert and 50 in the body. The protuberances have flat bottoms and a rounded side and are so spaced as to be received in their respective recesses to urge the insert to its cutting position in abutment with wall 30 of the insert pocket as fastener 20 is being screwed into position.

The insert has similarly shaped ends such that when cutting edge 38 has been worn, fastener 20 can be loosened until the cap releases the insert. The insert is the reversed end-for-end, until the two recesses are received into protuberances 62 and 64 and the cap tightened to locate the insert in its alternate cutting position.

Figure 4:
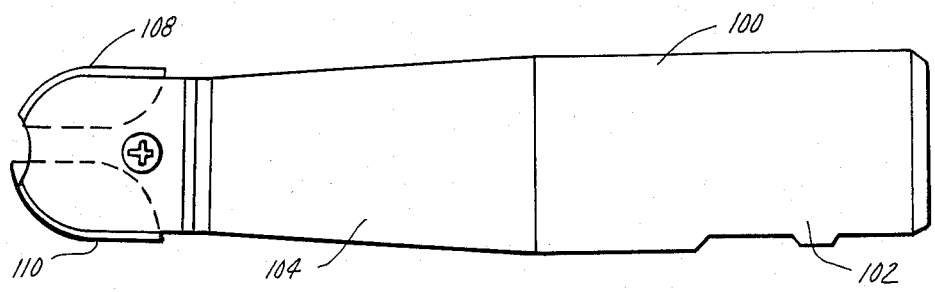
FIG. 4 is a view of another embodiment of the invention having a pair of inserts.
Figure 5:
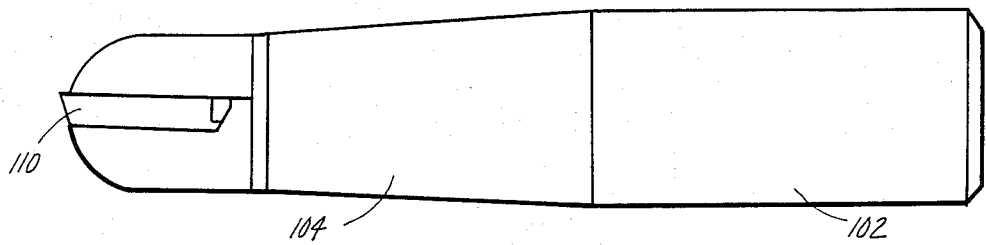
FIG. 5 is another view of the embodiment of FIG. 4.
Figure 6:
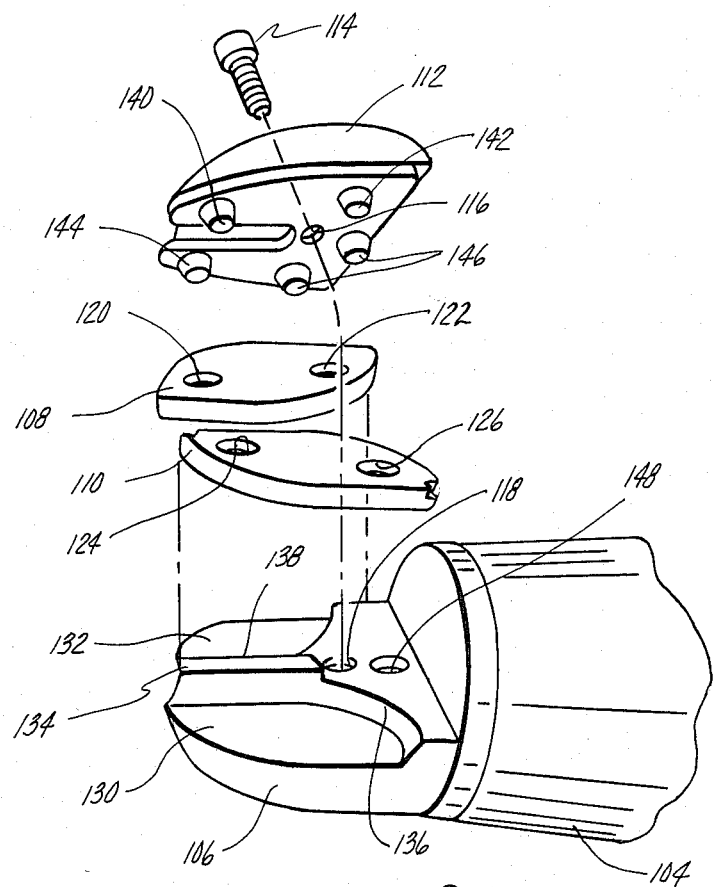
FIG. 6 is an exploded view of the embodiment of FIG. 4.

FIGS. 4, 5 and 6 illustrate another embodiment 100 of the invention having an elongated body 102. Body 102 has a tapered mid-section 104 and a narrowed end 106 for mounting a pair of inserts 108 and 110. Cap 112 is mounted on the inserts and threaded fastener 114 is passed through opening 116 in the cap and received in tapped hole 118 to connect the cap to the body. Inserts 108 and 110 are similar in shape to insert 34 illustrated in FIG. 3, except that insert 108 is smaller than insert 110, and has two cutting edges along opposite sides of its bottom surface whereas insert 110 has its two cutting edges along opposite sides of its top, wider surface. The bottom surface of insert 108 is wider than its top surface. Insert 108 is smaller than insert 110 and has a pair of recesses 120 and 122 in its upper surface. Insert 110 has a pair of recesses 124 and 126 is its top upper surface.

Body 104 has a pair of pockets 130 and 132 with flat bases for receiving inserts 110 and 108, respectively, on opposite sides of a raised section 134. The pockets are bounded by walls 136 and 138 which are similar to wall 30 in the embodiment of FIG. 3. The height of each wall generally corresponds to the thickness of the inserts.

Cap 112 has a pair of protuberances 140 and 142 received into recesses 124 and 126 of insert 110, and a second pair of protuberances 144 and 146 received into recesses 120 and 122 of insert 108. The cap also has a fifth protuberance 146 received into a recess 148 in the body. The recesses in both the body and the two inserts, are spaced in such a manner that as the cap is tightened to clamp the two inserts into position, the protuberances are received in their respective recesses to cooperate to urge the inserts toward their respective cutting positions. When the outer cutting edges of the two inserts have been worn, the cap can be released sufficiently to permit the inserts to be reversed end-for-end to locate their opposite cutting edges in the alternate insert cutting positions as illustrated in FIG. 4.

Having described my invention, I claim:

1. An elongated ball nose end mill cutting insert having spaced planar top and bottom surfaces separated by a pair of curved elongated side surfaces, the side surfaces being joined together one to the other at opposite ends thereof, both of the side surfaces being joined to the top surface on opposite sides thereof to form a pair of opposed cutting edges, each side wall forming an angle less than 90 degrees with respect to the top surface, the top surface having a pair of similarly shaped, spaced, frusto-conical recesses disposed generally along a line passing between the ends of the insert, whereby the insert is reversible end-for-end about an axis perpendicular to the top surface.

2. The combination comprising:
   an elongated tool holder having an elongated pocket open at a front end thereof, one side and a top, and having a closed side surface;
   an elongated cutting insert in said pocket in a cutting position, said insert having spaced, planar top and bottom surfaces separated by side surfaces, one of said side surfaces being joined to the top surface to form a cutting edge, the top surface having first and second similarly shaped, spaced, frusto-conical recesses disposed between the ends of the insert, the insert being mounted in the tool holder pocket such that the cutting edge extends beyond the open side and front end of the pocket;
   the tool holder having a third frusto-conical recess spaced from the first and second recesses in the insert on the opposite side of the closed side surface of the pocket as the first and second recesses;
   a cap mounted on the holder having three frusto-conical protuberances receivable in said first, second and third recesses; and
   fastening means for connecting the cap to the holder such that the protuberances are received in the recesses to cooperate to bias the insert toward the closed side of the pocket as the cap is moved to a clamping position in which the insert is disposed between the cap and the holder.

3. A combination as defined in claim 2, including a second pocket and an insert mounted in said second pocket in a second cutting position, and having a cutting edge and a pair of spaced recesses, and the cap has a second pair of frusto-conical protuberances receivable in the recesses of the second insert at such time as the second insert is in its cutting position.

4. A combination as defined in claim 2, in which the surface of the insert having said pair of recesses, is disposed in a common plane with the surface of the tool holder having said third recess at such time as the insert is disposed in said cutting position.

5. A combination as defined in claim 3, and in which the surface of the first mentioned insert and the surface of the second insert having said recesses are generally disposed in a common plane with the surface of the tool holder having the third recess.

6. A combination as defined in claim 2, in which the insert has a pair of cutting edges such that the insert can be reversed end-for-end with the pair of recesses being disposed to receive the protuberance means in the cap so that the insert is receivable in a cutting position in either position of the insert.

7. A combination as defined in claim 2, in which the tool holder has a keyway, the insert is disposed in its cutting position adjacent one end of the keyway, and the recess in the tool holder is disposed at the opposite end of the keyway.

8. A combination as defined in claim 3, in which each of said inserts has a pair of cutting edges, and each is reversible end-for-end to a second cutting position.

* * * * *